United States Patent [19]
Grossi et al.

[11] Patent Number: 4,551,178
[45] Date of Patent: Nov. 5, 1985

[54] ADDITIVES FOR HOT MIX ASPHALT

[75] Inventors: Anthony V. Grossi; Louis T. Hahn; Alfred Marzocchi, all of Newark, Ohio

[73] Assignee: Owens-Corning Fiberglas Corporation, Toledo, Ohio

[21] Appl. No.: 607,892

[22] Filed: May 7, 1984

[51] Int. Cl.$^4$ .............................................. C08L 95/00
[52] U.S. Cl. ........................... 106/273 N; 106/281 R; 208/44; 524/59; 524/71; 525/54.5
[58] Field of Search ...................... 106/273 N, 281 R; 524/59, 71; 525/54.5; 208/44

[56] References Cited

U.S. PATENT DOCUMENTS

| | | |
|---|---|---|
| 4,256,506 | 3/1981 | Mendenhall .................... 106/281 R |
| 4,268,318 | 5/1981 | Stone ................................. 106/284 |
| 4,273,685 | 6/1981 | Marzocchi ....................... 427/389.8 |
| 4,279,660 | 7/1981 | Kamo et al. ..................... 106/281 R |
| 4,301,051 | 11/1981 | Marzocchi et al. ................. 428/394 |
| 4,384,073 | 5/1983 | Grossi et al. ....................... 525/54.5 |
| 4,384,075 | 5/1983 | Grossi et al. ....................... 525/54.5 |

Primary Examiner—Paul Lieberman
Assistant Examiner—Amelia B. Yarbrough
Attorney, Agent, or Firm—Ronald C. Hudgens; Robert F. Rywalski; Debra L. Pawl

[57] ABSTRACT

A method for reclaiming used asphalt by mixing it with a chemically modifying system consisting of a polymerizable vinyl monomer and an alkenyl azabenzene.

8 Claims, No Drawings

ADDITIVES FOR HOT MIX ASPHALT

TECHNICAL FIELD

This invention pertains to asphalt recovery.

In one of its more specific aspects, this invention pertains to a method of recovering used asphalts in usable form.

BACKGROUND OF THE INVENTION

The use of asphalt is well known. Frequently, such asphalts are used in the form of an asphaltic mixture in combination with suitable aggregate, the combination being employed for the laying of asphalt surfaces. Such surfaces are frequently laid at elevated temperatures, the combination being known as an asphalt mix, the combination being cooled to form a durable surface.

In such mixes, the asphalt is generally the most expensive material and continuing efforts are made to recover the asphalt therein upon degradation of the surface to an unusable condition.

This invention is directed to those objectives.

STATEMENT OF THE INVENTION

According to this invention, there is provided a method of reclaiming asphalt which comprises mixing the reclaimable asphalt with a chemically modifying system consisting of a polymerizable vinyl monomer and an alkenyl azabenzene.

In one embodiment of this invention the reclaimable asphalt will be mixed with an unused, chemically modified asphalt consisting of asphalt, a polymerizable vinyl monomer and an amine of an alkenyl azabenzene.

DESCRIPTION OF THE INVENTION

By "reclaimable asphalt" as employed herein means any asphalt which has been used in asphalt surfacing, or has been exposed to oxidizing conditions for an extended time such as asphalt recovered from well sites, settling ponds, oil pits, oil reservoirs, and the like.

In the chemically-modifying system consisting of asphalt, a polymerizable vinyl monomer and an unsaturated, alkenyl azabenzene any suitable monomer can be employed which monomer has the general formula.

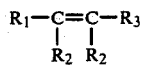

wherein $R_1$ is an aromatic group containing 6 to 12 carbon atoms including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group and the like; $R_2$ is preferably hydrogen or lower alkyl group, for example, a $C_1$ to $C_5$ alkyl; and $R_3$ is hydrogen, a lower alkyl or a group selected from the group consisting of —CH$_2$OH, —CHO;

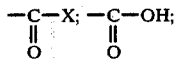

and CH$_2$—CN,
wherein X is a halogen and preferably chlorine or bromine.

Also, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula

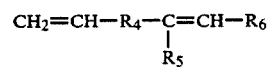

wherein $R_4$ is a divalent aromatic group containing 6 to 12 carbon atoms, and preferably a phenylene group; and $R_5$ and $R_6$ have the same meaning as described above with respect to $R_2$ and $R_3$, respectively for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

Of the foregoing, styrene is preferred.

Representative of suitable alkenyl azabenzenes are the alkenyl pyridine compounds of the formula

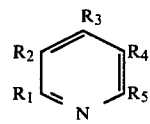

wherein $R_1$, $R_2$, $R_3$, $R_4$ and $R_5$ are independently selected from the group consisting of hydrogen, a $C_1$-$C_3$ alkyl, a $C_1$-$C_3$ alkoxy, halogen, cyano, nitro, amino with at least one of said $R_1$, $R_2$, $R_3$, $R_4$ or $R_5$ groups being an alkenyl group containing 2-5 carbon atoms. Representative of such alkenyl groups are 1 propenyl, 1 butenyl and 1 pentenyl. Preferably the alkenyl group is ethenyl. Preferred compounds are 2 vinyl pyridine and 4 vinyl pyridine.

Any suitable combination of recovered asphalt, monomer and azabenzene can be employed. The monomer and azabenzene will preferably be incorporated into an asphalt to form a chemically-modified asphalt. This chemically-modified asphalt will then be incorporated into the asphalt to be recovered in an amount within the range of from about 1 to about 10 weight percent of the total weight of the asphalts, preferably about three precent.

Generally, the chemically-modified asphalt will consist, in weight percent, of 85 to about 94.5 percent asphalt, of about 0.5 to about 5 percent of the azabenzene and from about 5 to about 10 percent of the monomer.

In the preferred embodiment, the chemically-modified asphalt will consist, in weight percent, of about 87 percent asphalt, 3 percent azabenzene and 10 percent of the monomer.

The recovered asphalt mixture will be reduced in size to no larger than the largest aggregate contained therein or to pieces about ½ inch in size. Without separating the aggregate which may be contained therein, the recovered asphalt mixture is heated to drive off essentially all water and fresh asphalt is added to form a homogeneous mixture. Generally, from about 0.5 to about 60 parts of fresh asphalt will be employed per part by weight of aged asphalt contained within the recovered asphalt mixture.

The chemically-modified asphalt will be blended with the fresh asphalt and the asphalt to be recovered in an amount within the range of from about 1 to about 5 weight percent, preferably in an amount of about 3 weight percent of the total weight of the asphalts.

The intermixing and forming of the chemically-modified asphalt will preferably be conducted at a temperature within the range of from about 110° C. to about 170° C. During what is believed to be a free radical-type reaction, there is a substantial increase in viscosity of the intermixture and this usually takes place in about 24 hours, indicating that the reaction is complete.

It will be evident from the foregoing that various modifications can be made to the method of this invention. Such, however, are within the scope of the invention.

We claim:

1. A method of reclaiming asphalt which comprises mixing reclaimable asphalt with a chemically modified asphalt consisting of a reaction product of unused asphalt, a polymerizable vinyl monomer having the general formula:

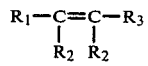

wherein $R_1$ is an aromatic group containing 6 to 12 carbon atoms selected from the group consisting of a phenyl group, a substituted phenyl group wherein the substituent is any one of an amino group, a cyano group, a halogen, a $C_1$ to $C_3$ alkoxy group, a $C_1$ to $C_3$ alkyl group, a hydroxy group, a nitro group, $R_2$ is hydrogen or lower alkyl group, and $R_3$ is hydrogen, a lower alkyl, —CH$_2$OH, —CHO,

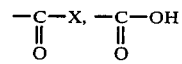

or —CH$_2$—CH and wherein X is a halogen and an alkenyl azabenzene, said chemically-modified asphalt consist of 85–94.5 percent asphalt, 0.5–5 percent azabenzene and 5–10 percent of the vinyl monomer.

2. The method of claim 1 in which said reclaimed asphalt is mixed with an unused asphalt.

3. The method of claim 1 in which said monomer is styrene.

4. The method of claim 1 in which said azabenzene is 2 vinyl pyridine or 4 vinyl pyridine.

5. The method of claim 1 in which said chemically modifying system is mixed with 85 to 94.5 weight percent asphalt.

6. The method of claim 1 in which said chemically modifying system consists essentially of about 3 parts by weight of said alkenyl azabenzene and about 10 parts by weight of said monomer.

7. The method of claim 1 in which said unused asphalt is mixed with reclaimable asphalt in an amount within the range of from about 0.5 to about 60 parts per part by weight of reclaimed asphalt.

8. An asphalt additive composition produced by reacting a mixture consisting of asphalt, a polymerizable vinyl aromatic monomer and an alkenyl azabenzene at a temperature of at least 110° C. for a period of about 24 hours.

* * * * *